Figure 1:
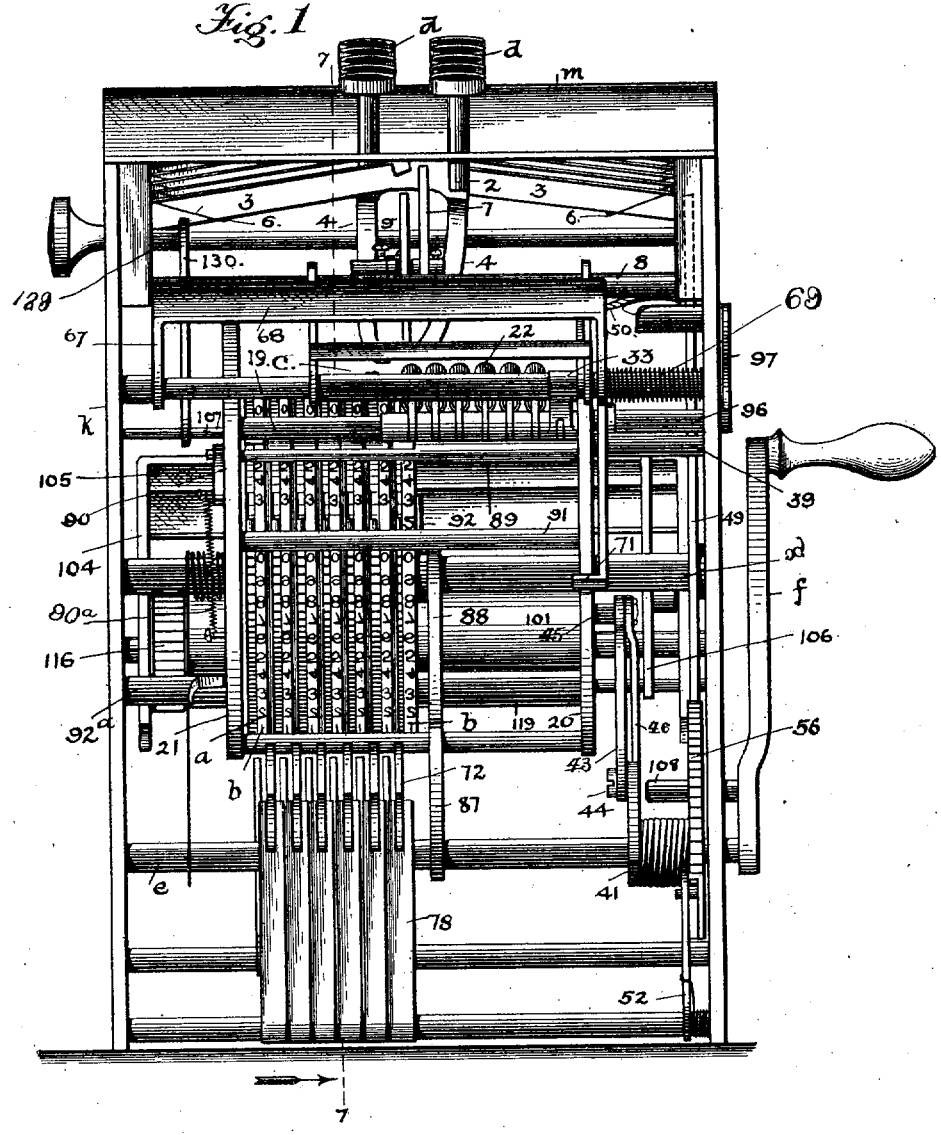

No. 712,795. Patented Nov. 4, 1902.
A. HOCH.
CALCULATING MACHINE.
(Application filed Apr. 30, 1901.)

(No Model.) 7 Sheets—Sheet 1.

Witnesses:

Inventor
Adam Hoch

No. 712,795.

A. HOCH.
CALCULATING MACHINE.
(Application filed Apr. 30, 1901.)

(No Model.)

Patented Nov. 4, 1902.

7 Sheets—Sheet 2.

Witnesses:

Inventor
Adam Hoch

No. 712,795. Patented Nov. 4, 1902.
A. HOCH.
CALCULATING MACHINE.
(Application filed Apr. 30, 1901.)
(No Model.) 7 Sheets—Sheet 3.

No. 712,795. Patented Nov. 4, 1902.
A. HOCH.
CALCULATING MACHINE.
(Application filed Apr. 30, 1901.)
(No Model.) 7 Sheets—Sheet 4.

Witnesses
Inventor
Adam Hoch

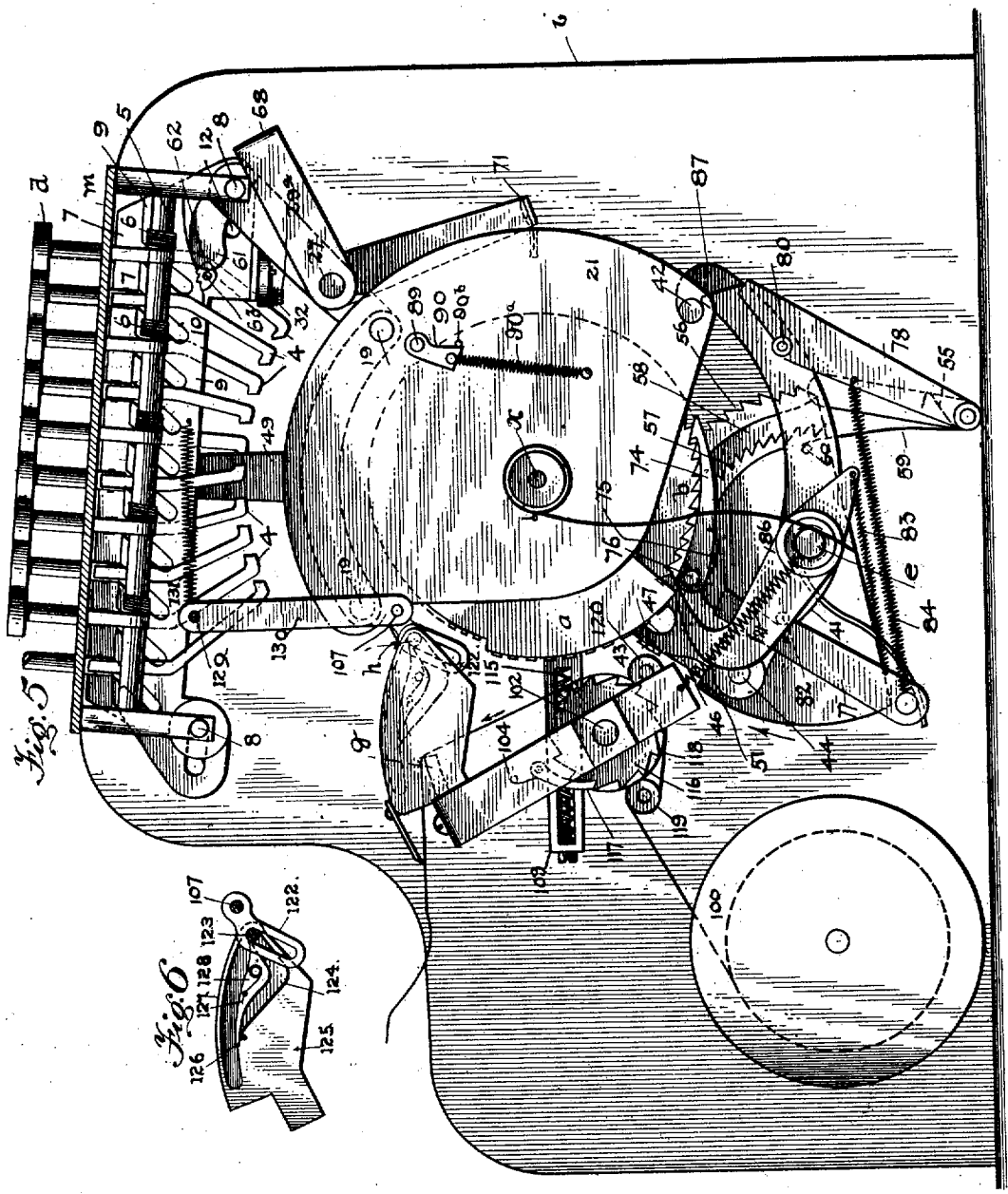

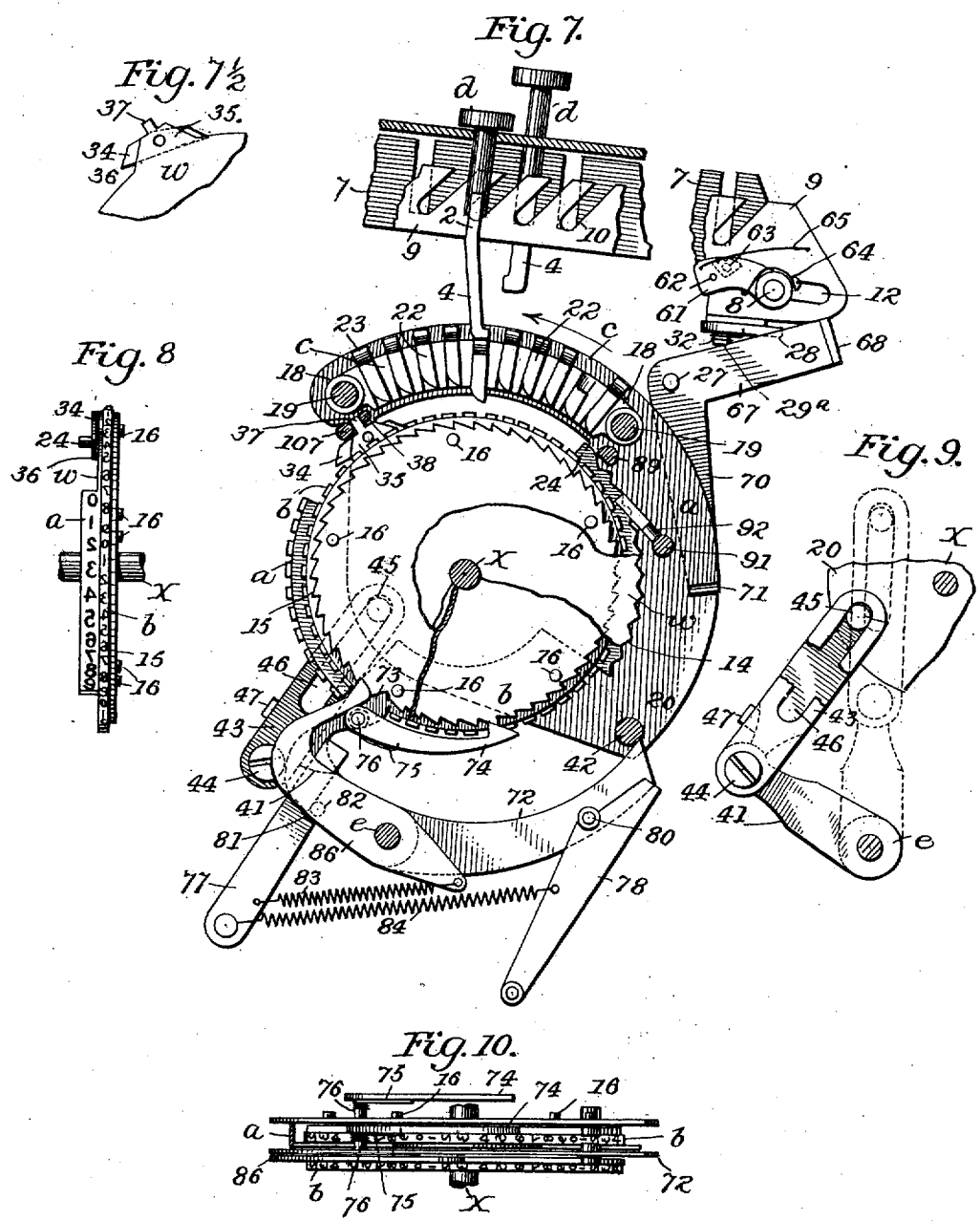

No. 712,795. Patented Nov. 4, 1902.
A. HOCH.
CALCULATING MACHINE.
(Application filed Apr. 30, 1901.)

(No Model.) 7 Sheets—Sheet 7.

Inventor
Adam Hoch

Witnesses

By
Attorneys

UNITED STATES PATENT OFFICE.

ADAM HOCH, OF ALAMEDA, CALIFORNIA, ASSIGNOR, BY DIRECT AND MESNE ASSIGNMENTS, TO WENDLING-HOCH ADDING MACHINE COMPANY, OF SAN FRANCISCO, CALIFORNIA, A CORPORATION OF CALIFORNIA.

CALCULATING-MACHINE.

SPECIFICATION forming part of Letters Patent No. 712,795, dated November 4, 1902.

Application filed April 30, 1901. Serial No. 58,204. (No model.)

*To all whom it may concern:*

Be it known that I, ADAM HOCH, a citizen of the United States, residing at Alameda, in the county of Alameda and State of California, have invented a new and useful Improvement in Adding and Recording Machines, of which the following is a specification.

This invention relates to improvements made in machines or mechanical devices for printing rows of figures in arithmetical order and for calculating the sum-total and printing the same at the bottom of the columns.

The improvements involved in the construction of the present machine relate more particularly to novel construction and combination of numeral printing-segments and selecting and setting mechanism controlled by a single set of ten finger-keys, by means of which the printing-segments brought into operation to print a row of figures to any required order are set to position to print and are afterward brought in contact with the paper to print the entire row at a single operation, together with a separate set or series of adding-wheels having also the function of printing-wheels to print the sum-total, and operating mechanism also controlled from the same finger-keys and actuated from the setting mechanism of the printing-segments to add one row of figures to another as they are printed; also, novel paper-controlling and type-inking devices for operating to ink the type-faces and bring the paper in working contact with the segments or the adding-wheels at the proper times to print the rows of figures and afterward the total.

The improvements include also novel locking means by which the setting and printing mechanism reciprocally control each other and prevent the printing operation of one from being performed until the other has completed its operation either of printing a row of figures or of printing the totals; also, a key-locking means of improved construction whereby the movement of any one key in the series automatically locks all the remaining keys and releases them only after the mechanism actuated by that key has completed its stroke and the key has returned to position.

The improvements embrace also certain novel construction and combination of parts having for their object to produce a simple and accurately-operating machine of the character described at a comparatively low cost.

The nature of these improvements and the manner in which I proceed to construct, apply, and carry out the same are explained at length in the following description, reference being had to the accompanying drawings, forming part thereof, and in which—

Figure 2:
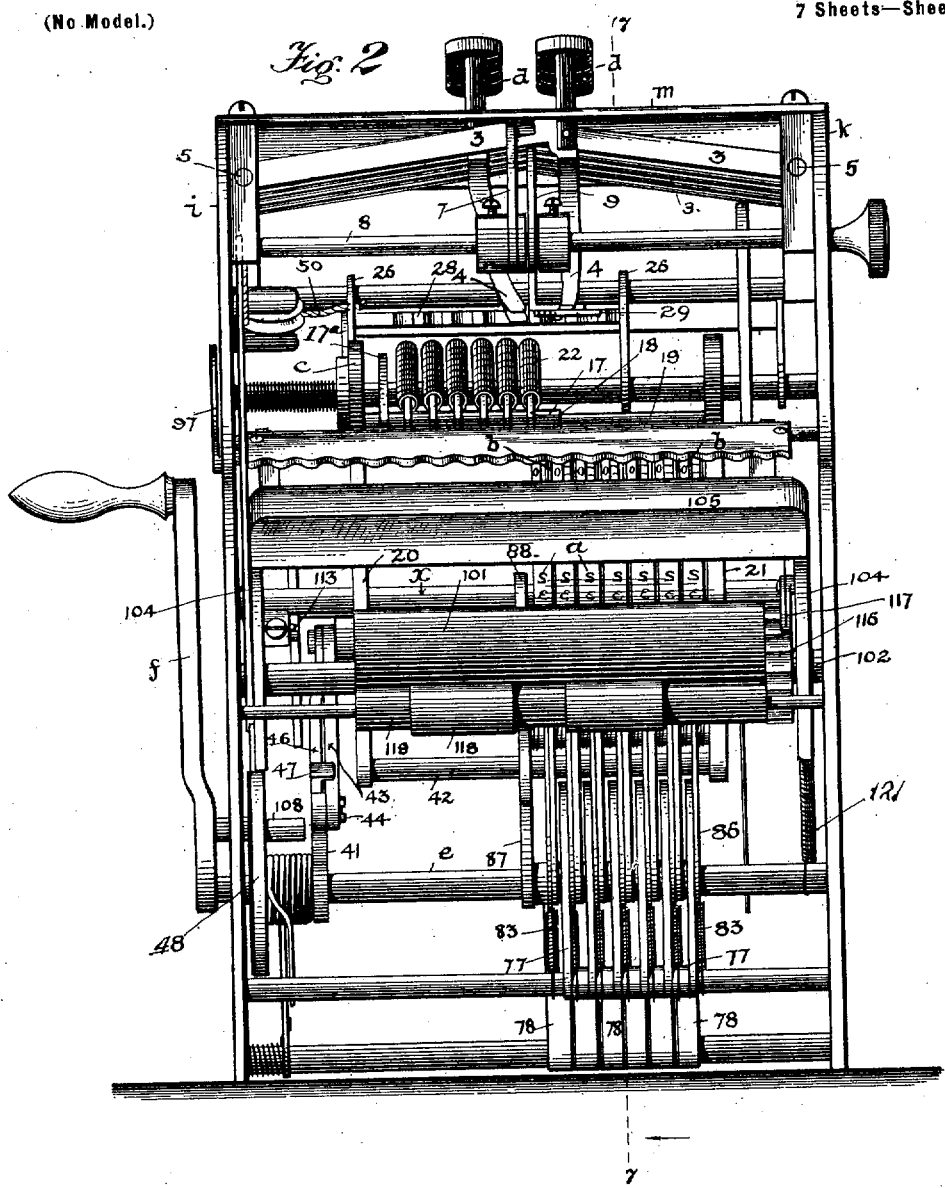
Figure 3:
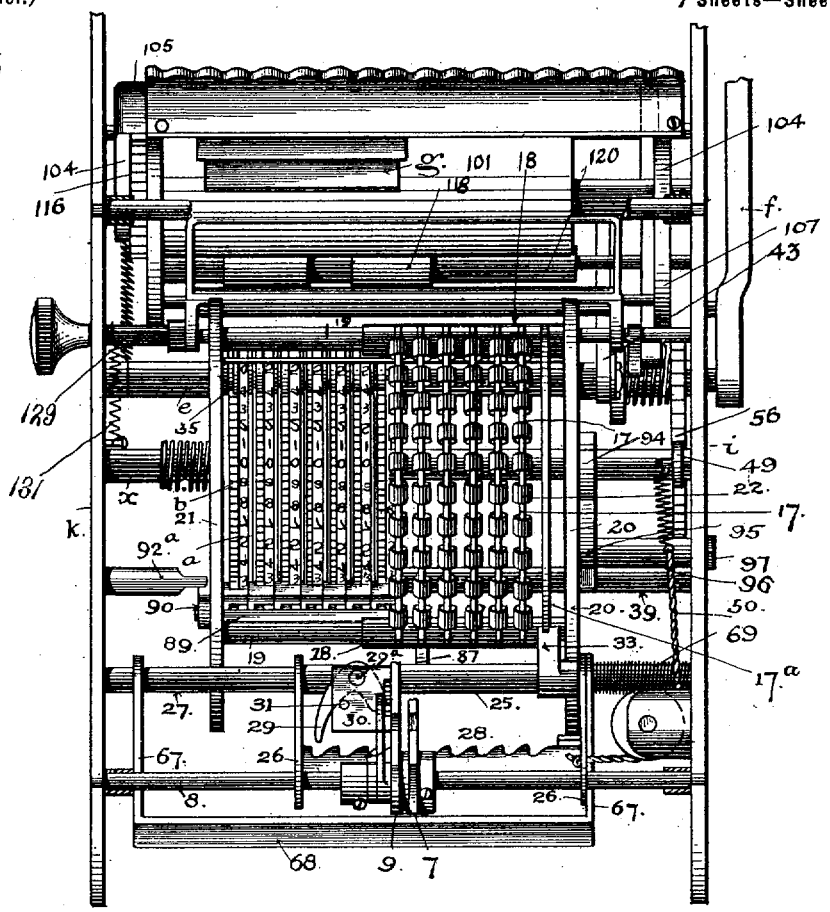
Figure 4:
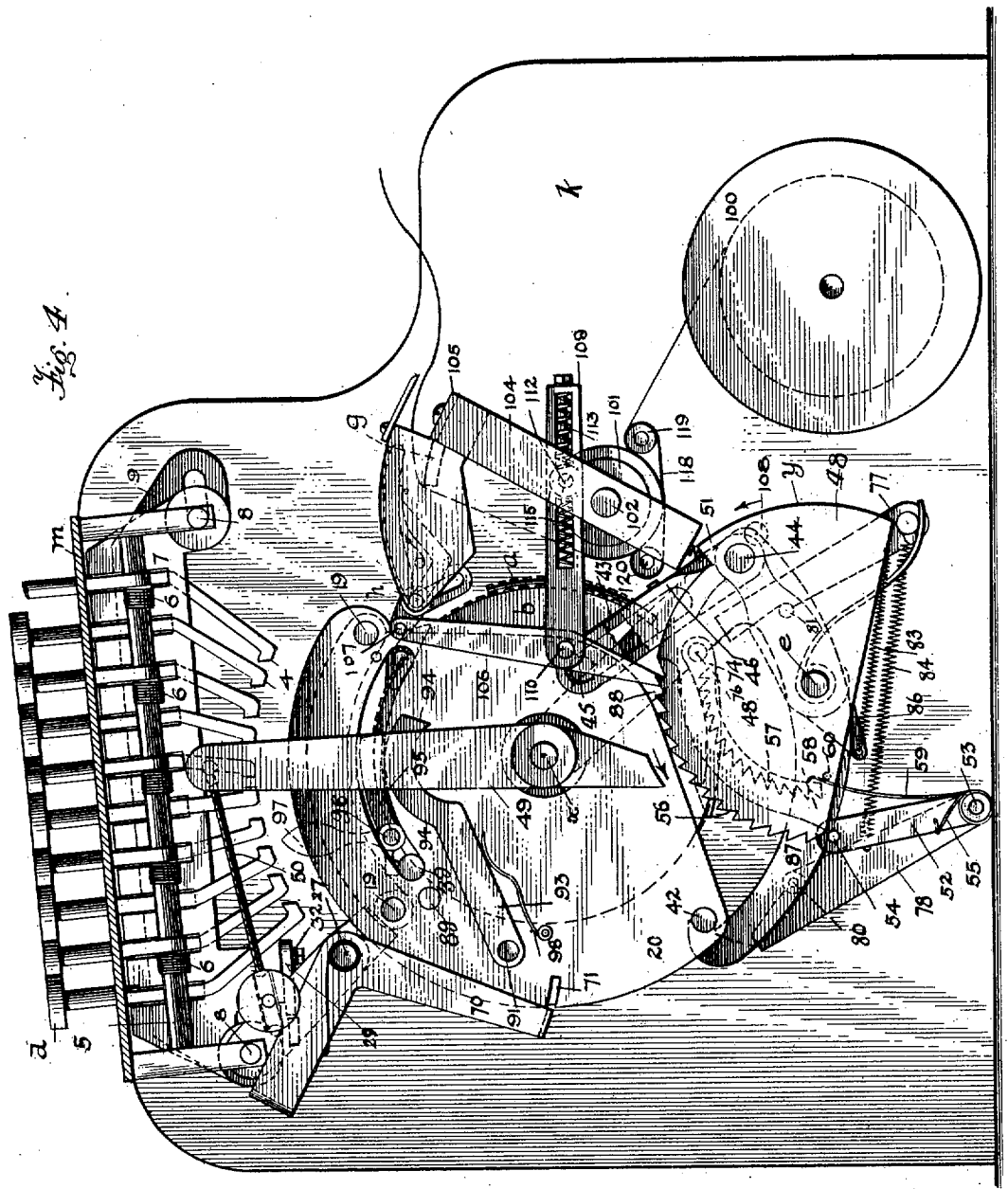
Figure 11:
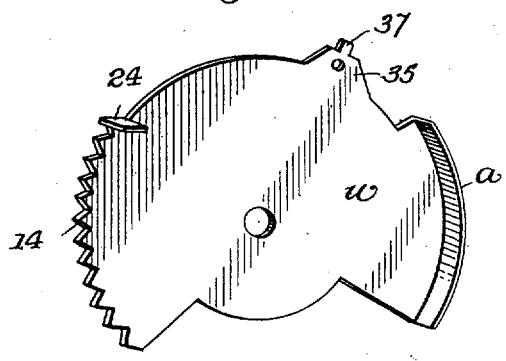
Figure 13:
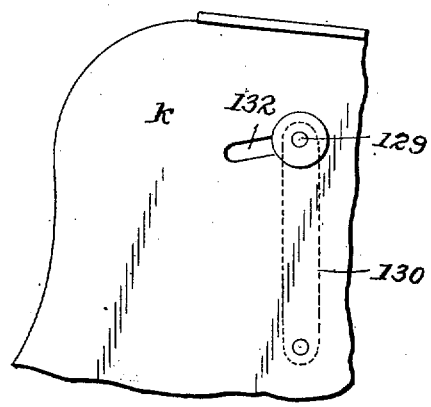
Figure 12:

Figure 1 is a front elevation of an adding and printing machine embodying these improvements. Fig. 2 is a rear elevation. Fig. 3 is a top plan. Fig. 4 is a side elevation from the right side of Fig. 1, the side being removed to expose the parts within. Fig. 5 is a side elevation taken from the left side of Fig. 1. Fig. 6 is a vertical longitudinal section through the inking-roller and its guides. Fig. 7 is a detail side view, principally in longitudinal section, of the selecting device, printing-segments, adding-wheels, and the accumulating mechanism, together with the key-controlling mechanism, the section being taken on line 7 7, Figs. 1 and 2, to the right of the line in Fig. 1 and to the left in Fig. 2. Fig. 7½ is a detail of the dog that connects the printing-segment to the adding-wheel. Fig. 8 is a view taken from the left side of Fig. 7, but with the "units" adding-wheel and the "tens" printing-segment omitted. Fig. 9 is a detail of the automatic throw-off crank connecting the oscillating carrier of the selector with the principal operating-lever. Fig. 10 is an inverted or bottom plan, taken from the under side of Fig. 7, showing the units-wheel and the tens-wheel in the adding-wheel series, together with some parts of the transferring mechanism by which the tens-wheel is moved the distance of one notch or number in every rotation of the units-wheel ten notches or numbers. In this figure the units printing-segment and the "hundreds" printing and adding wheels are omitted. Fig. 11 is a side view of the disk carrying the printing-segments. Fig. 12 is a detail view of the inking-roller. Fig. 13 is a detail view of a portion of the side plate $k$.

The principal parts or members of the machine comprise the printing-segments $a$, one for each order or place of numbers, adding-wheels $b$, selecting device $c$, finger-keys $d$, principal shaft $e$, hand-lever $f$ for giving motion to that shaft, and paper-platen $g$ and inking-roller $h$.

The segments $a$, having for their principal function to print figures in arithmetical sequence in a row, are preferably formed of a segmental flange on a thin disk $w$, on which flange the numerals in raised characters are arranged in a line. They are herein designated as "printing-segments." The adding-wheels $b$, on the other hand, being adapted to operate first as an adding device and afterward as a recording device to print the total, are designated as the "adding-wheels;" but this term, it will be understood, comprehends the two functions of registering and recording. These parts are included in a case composed of side plates $i$ $k$ and removable plates covering the top and ends and forming a frame of suitable character to support and furnish bearings for the various shafts and parts of the mechanism.

The ten finger-keys $d$ are disposed in two rows at uniform distances apart on opposite sides of a median line running longitudinally across the top plate $m$, each key being pivotally attached at the lower end 2 to an oscillating rocker-arm 3, having a downwardly-bent member 4 on one end and the opposite end fitted to turn on a fixed pin 5, on which as a center the arm is moved in a limited arc by depressing the finger-key. A coiled spring 6 to each arm holds it at the highest point and the key in elevated position when at rest and also returns the parts to place on removing the finger from the key. The extent of the upward throw is controlled by the contact of the rocker-arm 3 with the top plate $m$. The downward movement is controlled by a stationary slotted plate 7, having an upright slot for each arm and supported on edge from stationary cross-rods 8 on the frame. Parallel with and on one side of the stationary slotted plate a plate 9, having a corresponding number of inclined slots 10, is supported by the same rods 8 which set through longitudinal slots 12 in the ends of the plate, in consequence of which this plate is movable longitudinally instead of being fixed and immovable, as is the plate with the upright slots. The slots in the stationary plate are in line with the plane of movement of the rocker-arm; but in the movable plate they stand at an angle from the perpendicular with their open ends directly in line with the rocker-arms when the parts are at rest and the keys in elevated position. In consequence of this diagonal position it follows that when a key is depressed and the rocker-arm moves down the slot in the plate 7 and enters a slot in the plate 9, the plate having the inclined slots must slide longitudinally in order to let the rocker-arm move down the straight slot, and if the side plate be locked or held at any point in that movement while the key is being pressed in the rocker-arm will be arrested and cannot move in either direction until the slide plate 9 moves. This also prevents a second key from being operated until the key previously depressed has completed its stroke and has returned to position, because the inclined slots being thrown out of line with the rocker-arms of all the remaining keys the top edge of the plate lying between the slots prevents all of them from entering the inclined slots until after the plate has returned to position. In addition to this action the slide-plate prevents a key from rising or returning to position until it has made a full stroke, and in the event of the pressure being taken off a key at any time before it has reached the limit of its inward movement the slide-plate not only locks all the keys excepting the one being operated, but it prevents that key from returning to position until it has finished its stroke. By that means the proper time and length of throw of movement of each key necessary to actuate the mechanism is insured.

The printing-segment $a$ is a flange formed on a disk $w$, on which flange the numerals in the form of printing-type are arranged as shown and a portion of the remainder of the circumference of the disk is provided with teeth or notches 14. In close relation to each disk $w$, but separated therefrom for proper clearance, is an adding-wheel $b$, on the rim of which the same numerals in raised characters or type-faces are repeated in several series to extend around and fill up the entire circumference of the wheel. One of such printing-disks and of such adding-wheels is provided for each place or order of numbers and all are mounted to turn on a common stationary shaft or axis $x$, supported at the ends in the sides of the frame, the segmental printing-flange of each disk $w$ extending over the rim of the corresponding wheel $b$ of the same order, the units printing-segment over the units register-wheel, and so on throughout the whole series, and being so spaced on the shaft as to maintain true alinement between the numbers on the segment and those on the adding-wheel. On the periphery of each of the last-mentioned wheels are ratchet-teeth 15, properly spaced to agree with the spaced-type numerals, and at every division or tenth tooth is a stop-pin 16, projecting from the side of the wheel. In the present construction each wheel $b$ has the nine digits and a cipher repeated five times, and consequently the wheel is provided with five stop-pins evenly spaced around the circumference. One or more of these divisions containing ten numerals can be added by increasing the diameter of the wheel, or the number of figures in each division can be varied when the machine is required to print and add in other than decimal numbers by increasing the diameter of the wheel accordingly and changing the numbers of the ratchet-teeth and stop-pins to correspond.

Between the keys and the two sets of wheels a b is interposed the part c, herein termed the "selecting" device, constituting a part of the setting mechanism that moves and sets the wheel to position to print and add the figures corresponding to the numbers on the keys selected and depressed.

As the machine herein shown is constructed to add and print to hundreds of thousands, or six places of numbers, the selecting device is formed of that number of bars 17, one for each order, united at the ends by cylindrical heads 18, that are fitted to slide on guide-rods 19 transversely in an oscillating frame or carrier composed of side plates 20 21, in which the guides 19 are fixed parallel with the axis. The frame last mentioned has for its center of motion the axis x, and the movement of the selector 17 18, mounted therein, is concentric with the wheels in an arc of uniform length first in the direction indicated by the arrow in Fig. 7 between the selector and the adding-wheels, and, secondly, in the direction of the arrow above the selector.

Each bar composing the selector is provided with ten push-pins 22, fitted in grooves in the bar and having projecting heads 23 equally spaced on the bars and also set on converging lines. The bars being shaped to follow the curvature of the wheels over which they lie all the push-pins are of equal length. The pins are preferably formed of strips of spring metal bent to form loops which straddle the bars, and there is sufficient friction between the pins and bars to hold the former in position on the latter until the pins are positively moved. From the inner edge of the curved bar the ends of the push-pins project a sufficient distance to engage the end of a stop 24 on the disk w whenever the head of the pin is pressed in by the key.

The rocker-arms 3 extending from one side of the machine overlap at their face ends the arms extending from the other side, and each arm carries a downwardly-extending finger 4. As the arms are rocked the fingers move in the arc of a circle, and the fingers are so bent that the arc of movement of the lower end of a finger of one side will intersect the arc of movement of the lower end of a finger on the other side, and the line of intersection will be that of one of the rows of heads 23 of the pins 22. No matter, therefore, which key is depressed it will cause the lower end of the finger 4 operated by it to engage the head 23 of the proper pin. It follows, therefore, that the ends of the ten fingers, if they were depressed at the same moment, would stand on the same line longitudinally over the selector and would make contact with only the push-pins on that one of the curved bars setting directly on that line and with none other. Thus from the single set of keys any one of the push-pins on a bar 17 is selected and pressed in, and by moving the selector transversely in the carrier the several bars are brought in successive order under the key-actuated arms, and a transverse movement of the selector takes place from right to left the distance of the space between one bar and the next, thus bringing the several lines of push-pins in position under the keys to be acted on in successive order, and finally the selector will be over the printing-wheels in the same numerical rotation as the numbers are written—that is to say, from left to right. These step-by-step movements carry the selector 17 18 from the space at the right between the wheels a b and the side plate 20 of the oscillating carrier directly over the wheels and between the printing-segments a and the stops 24, the push-pins being of such length that while their projected inner ends will engage the projecting stops 24 they will clear the peripheries of the wheels. The operation of shifting the selector transversely step by step from right to left in this manner is effected by the means shown in Figs. 2, 3, and 7.

A movable frame composed of a tubular rod 25 and arms 26, fitted to slide on the front rod 8 and a fixed rod 27, carries a ratchet-bar 28, with which a pawl 29, attached to the slotted slide-plate 9, is set in position to engage on the forward throw of that plate. The pawl is pivoted at 29ª on a lateral extension 30 of the slide-plate and is held against a stop-pin 31 by a spring 32, so that when at rest and setting clear of the rack the point of the pawl extends from one side of its carrying-plate. At the beginning of each forward throw of the slide-plate the point of the pawl is first brought in contact with the ratchet-bar 28, and entering one of the notches it resists the further longitudinal movement of the slide-plate; but under the pressure of the key that part continues to move, and in finishing its stroke it causes the pawl 29 to press the ratchet-bar 28 laterally or at right angles, thereby causing the latter to slide on the guides. This sliding movement is transmitted to the selector 17 18 by an arm 33, extending rearwardly from the tubular rod of the slide-frame and engaging the top or outer edge of the first curved bar 17, that unites the two heads 18 of the selector. The bar 17 last mentioned fits loosely in a notch in the end of the arm 33, and its curved outer edge being concentric with the axis on which the oscillating frame of the selector turns it connects the selector with the slide-frame and yet permits movement of the selector around the axis in the direction of the arrow, Fig. 7, between the selector and adding-wheels. Moving in that direction after the proper push-pins on the required number of bars 17 have been selected and depressed, the inner ends of those pins which project in line with the stops 24 of the printing-disks engage and carry the disks around with the selector, each disk being moved a greater or less amount, according to the distance between the end of the stop 24 and the push-pin before it begins to move. This movement sets the printing-segment in line with the platen at the rear to print the numeral that corresponds to the key that sets the push-pin. In the same operation the adding-wheel belonging to each printing-segment is engaged by a pawl 34, pivotally attached to an ear or extension 35 of the printing-disk in line with the ratchet-teeth on the side of the adding-wheel. The tail 36 of each dog being beveled on the upper edge passes under and is brought against a cross-rod 107, supported in the main frame and extending behind the oscillating carrier. In the return throw of the oscillating carrier by which the selector is brought back to place after one row of figures has been printed the printing-segments are also brought back to the starting-point again by a cross-rod 38, extending between the sides of the oscillating carrier and engaging the projecting tips 37 of the extensions 35 on the disks $w$. All the segments are carried back until arrested by the cross-rod 107 of the main frame, and being caught between the stationary and the movable rods last mentioned the projecting tips 37 of the disks $w$ are properly set and alined for the next forward movement at the same time that all the pawls 34 are thrown up clear of the adding-wheels. In addition to its movement transversely from right to left and also in a circle around the two sets of wheels thus produced the selecting device is returned from left to right back to position at the end of the circular motion to bring it clear of the wheels before it returns to position at the top of the space at the right of the wheels. In such return the projected pins are moved in flush with the inner edge of the curved bars 17 by contact with a stationary bar 39, extending from the side plate $i$ of the main frame through a slot in the adjacent side of the selector-carrier and across the space under the curved bars 17. (See Figs. 3 and 4.) As the beveled points of the push-pins are drawn over the stationary rod in the upward motion of the selector they are set in flush with the curved bars 17.

The above-described movements of the oscillating carrier and of the selector in that carrier are produced from a single forward throw of the rocking lever $f$ through the medium of the following parts and connections: A crank-arm 41, fast on the rock-shaft $e$, to which the lever is fastened on the outer side, is connected to the side plate 20 of the oscillating carrier on the side next the lever by a slotted connecting-rod 43, pivoted to the end of the arm at 44 and fitted to slide on a stud 45 on the plate. Against the side of this slotted rod 43 is an arm 46, loosely hung on the stud 45 and free to swing and hang perpendicularly downward therefrom when the crank is on one side of a perpendicular position, but is retained in place parallel with the slotted rod 43 when the crank-arm is on the other side of said position by a lug 47, that engages and rides on the edge of the slotted rod 43, as shown in Fig. 9. In the position there represented the free end of the swinging member 46 rests on the outer end of the crank-arm and prevents longitudinal movement of the slotted rod on the stud, and when the crank-arm is swung over by the lever $f$ the arm 46 will move the stud 45 upwardly until the crank-arm reaches a perpendicular position. When, however, the crank passes beyond the perpendicular position, the swinging member 46 will hang perpendicularly down from the stud and clear of the crank-arm, and the slotted member by the continued movement of the crank will pull on the stud 45 and move it downwardly to its normal position. When the lever $f$ is returned, the crank will move with it, and the slotted rod will first slide upwardly on the stud 45 and then downwardly thereon until it reaches its normal position, (shown in full lines in Fig. 9,) and in the latter part of this movement it will pick up the arm 46 by engaging the lug 47.

All the movements of the several mechanisms are produced in the forward throw of the hand-lever, as the throw-off connection between the crank-arm and the carrier allows the hand-lever to return without moving that part.

The crank and the stud are so adjusted as to position that in the first half of the throw from the lowest position (shown in Fig. 9) to the perpendicular (indicated in dotted lines) the selector is carried from its highest position over the wheels $a b$ downward to the front for the full extent of that movement, while in the remaining half of the throw the oscillating carrier is moved back, and the selector is brought back to the highest point again. The downward movement of the selector is effected by the arm 46 and its upward movement by the slotted rod 43. When the parts are in their normal position, the outer end of the slot in the rod 43 is not in engagement with the stud 45, and it is not until after the crank has passed a short distance beyond a perpendicular position that the end of the slot will engage the stud 45 to move the latter and the selector, and consequently before the selector begins its return movement under the pulling action of the rod 43 there will be a slight lost movement between the slotted rod 43 and the stud 45, and during this lost movement the selector will not move either downwardly or upwardly. Before the selector begins its return movement it is necessary to shift it from left to right to set it clear of the wheels, and this movement is effected during the pause caused by the lost movement between the slotted rod 43 and the stud 45. The lateral movement is effected by means actuated from the same rock-shaft $e$, consisting of the segmental disks 48, fast on the shaft $e$, a rocking lever 49, movable in a vertical arc on the stationary shaft $x$, and a cord 50, connecting the upper end of that lever with the slide-frame that carries the ratchet-bar.

The lower end of the lever 49 is shaped to ride on the raised concentric portion $y$ of the disk 48 and is of proper length also when standing in upright position to set in the path of a shoulder 51 at the leading end of the concentric portion $y$, by contact with which shoulder 51 the shorter end of the lever is pressed forward, or in the direction indicated by the arrow in Fig. 4, thereby carrying the opposite end backward and drawing the slide-frame over to the right in the oscillating carrier. After this movement, which takes place at the beginning of the last half or portion of the forward throw of the hand-lever, the lower end of the lever 49 rides upon the elevated concentric portion $y$ of the segmental disk 48 and is thereby kept from returning to the position from which it was moved until the segmental disk 48 is moved back to the starting-point. In the movement from left to right all the projected pins 22 will pass either above or below the stops 24, for, as shown in Fig. 7, that portion of the disk $w$ in which the notches 14 are formed does not project as far as the stop 24, and consequently any depressed pin can pass laterally across such portion without contacting with it.

In addition to the function above described the segmental disk 48 forms part of a device controlling the movement of the hand-lever to prevent that part from returning to its first position after it has begun to move forward and compelling the full length of its throw in that direction to be made, thereby insuring the proper motions and operation of all the parts that are actuated by or from the hand-lever. The construction of this controlling means is shown in Figs. 4 and 5. An arm 52, loosely mounted on a stationary shaft 53, carries on the outer end a pin 54, that projects over and is held by a spring 55 in working contact with a ratchet-toothed segment 56 on the edge of the segmental disk in advance of the shoulder 51. This segment is concentric with a series of internal ratchet-teeth 57 on the lower edge of a groove 58, formed in the side of the segmental disk and open at both ends, and in which the pin 54 on the end of the arm is caused to return or move back after having passed over the external teeth of the segment, the spring 55 being arranged to press the pin of the arm against the external teeth as the cam is turned in the forward direction (indicated by the arrow, Figs. 4 and 5) and on the return movement to bring the pin 54 in contact with the internal ratchet 57, over which it is required to pass in the opposite direction. In traveling over the outer ratchet the pin 54 slips over the teeth as long as the motion of the cam continues in the same direction; but if that motion be reversed before the pin reaches the end of the ratchet and drops into the groove 58 the pin catching in the ratchet-teeth will arrest the cam at such moment and prevent its moving back. In like manner when traveling in the concentric groove 58 the pin will travel over the internal ratchet; but as its teeth are set in opposite direction to the external ratchet the cam is free to make the return movement and is only arrested if the direction of the movement be changed from backward to forward at any time. At the end of the return over the internal ratchet and as the pin 54 arrives at the end of the groove a second spring 59 behind the arm throws the outer end forward out of the groove and in position to ride on the external ratchet again when the hand-lever is drawn forward again. The second spring 59 does not act, however, until its free end is engaged by a stop-pin 60 on the side of the segmental disk, which takes place only at the end of the reverse or backward throw of the hand-lever, and therefore it does not act in opposition to the spring 55 except at that moment. As soon as the hand-lever starts to move forward the stop-pin is drawn away from the spring 59, thereby allowing the other spring to bring the pin 54 against the external ratchet. In every complete throw of the hand-lever, therefore, the free end of the swinging arm is caused to travel over the external ratchet to the top and then back over the internal ratchet, and the full length of throw of the lever in one direction must take place before the lever can return to the starting-point. A similar controlling means applied to the sliding slotted plate of the key-locking device prevents that plate from moving backward until it has completed its forward throw, in consequence of which a key must be given a full stroke before it can return to position. The construction of this controlling means is shown in Figs. 5 and 7, in which the arm 61, loosely hung on the stationary guide-rod 8 and carrying on the free end a pin 62, is set to work in relation to a toothed block 63 on the adjacent side of the slotted slide-plate 9. In the reciprocating movement of that plate the end of the arm 61 is caused to travel in a continuous path in one direction around that block, as a spring 64, acting in an upward direction on the arm, tends to hold the pin 62 against the lower edge, and a spring-tongue 65, having its free end resting on the top of the block 63, keeps the pin in contact with the toothed upper side of that piece. The two springs 64 65 control the pin-carrying end of the arm in such manner that in every complete movement of the slide-plate forward and back the pin will pass over the top of the block and between its toothed edge and the spring-tongue and thence around and against the bottom edge to the starting-point; but at all times in such motion it is compelled to travel in the same direction and is prevented from moving backward at any time by the pin, because the reverse movement will cause the pin 62 to engage the teeth on the switch-block 63. In addition to these locking devices there is provided a means whereby the mechanism that sets the printing-wheels and that which operates the adding-wheels reciprocally control and lock each other, preventing one operation of the machine from taking place until the other is finished.

A rocking frame composed of the side arms 67 and cross-bar 68 is loosely hung by its arms on the stationary guide-rod 27, with the cross-bar directly in front of and in the path of the forward end of the sliding slotted plate 9, against which it is held by a coiled spring 69 (see Figs. 1 and 3) with a yielding pressure that allows it under ordinary conditions to move forward under the pressure of the slide-plate without arresting that part. From one side of this yielding stop-frame, composed of the cross-bar and its two side arms, an arm 70, extending downwardly, is turned at the end at right angles, so as to ride on the concentric front edge of the side plate 20 of the oscillating carrier, and at one point in that plate an open slot 71 of proper depth allows the bent end of the arm 70 to enter. This opening, however, is so situated that it comes in line with the free end of the arm 70 only when the oscillating carrier stands at rest and in its extreme forward position. At such times the arm 70 is free to swing backward and allow the stop-frame to move; but when the carrier moving on its axis throws the opening out of line with the end of the arm 70 the latter riding on the edge of the side plate locks the stop-frame 67 68 and holds it across the end of the slotted plate 9.

In the position of the parts as last described the keys cannot be operated and the setting mechanism is locked out as long as the oscillating carrier and the adding and printing mechanism actuated by or from that part are in action. Reciprocally the last-named mechanisms are locked and rendered inoperative when the slotted plate 9 begins to move forward under the pressure of a key, because the arm 70 of the stop-frame must be in line with and enter the slot 71 before the slide-plate can move at all, and in that position the oscillating carrier is locked until the sliding slotted plate returns to position. The operating movements of the keys and the hand-lever are thus controlled one from the other in this manner and the parts actuated by one are locked while the other is being operated.

In the operation of carrying the numbers accumulated on one adding-wheel to the next higher wheel in the series each wheel being carried around by the corresponding printing-segment ten teeth or numerals turns the next higher adding-wheel one tooth or numeral whenever the preceding wheel is again turned by its segment an additional tooth, and this operation is performed automatically by a combination of dogs and levers constituting the carrying mechanism, the construction of which is shown in Figs. 1, 2, 4, 5, 7, and 10.

Loose on the stationary shaft e, that extends across the main frame, is a separate rocking lever 72 with one member inwardly curved and terminating in a toe 73, that acts in line with the pins 16 on the same wheel, and the other member extending from the center of motion of the lever to the front in a curve which is eccentric with the axis x of the oscillating frame. Pivotally attached to the lever near the toe 73 is a dog 74 with a hook-shaped end setting in line with the ratchet-teeth on the next higher adding-wheel in the same series and held up in working contact with those by a spring 75. This dog is carried by a stud 76, fixed in the side of the lever 72 and extending across the type-bearing face of the next adding-wheel, so as to bring the dog in line with the ratchet-teeth on that wheel. The relative position of the dog 74 and the lever that carries and actuates it are shown in Fig. 7, where the dog is in line and working contact with the teeth of the hundreds adding-wheel, which is partly broken away to uncover the tens-wheel behind it and to show the position of the toe 73 with relation to the pins 16 of the tens-wheel. In that detail it will be noticed that the printing-disk belonging to the tens adding-wheel and the printing-segment situated between that wheel and the hundreds-wheel in front is omitted.

In the detail Fig. 10 it should be understood that the hundreds adding-wheel and the printing-segments both of that wheel and of the units adding-wheel are omitted.

It will be seen by referring to Fig. 7, where the parts are supposed to be in normal position, that the inclined face of the dog 74 is engaged with the inclined face of a tooth on the adding-wheel, but that its working face does not engage with the radial face of the tooth. The dog can therefore have a limited movement without actuating the adding-wheel.

On the side of each lever 72 near the forward end is a roller-stud 80, setting in a half-round recess in a spring-impelled bar 78 and held normally in that recess by friction when the parts are at rest. There is a trigger-bar 77, having a square shoulder or notch 81, that is held under a fixed pin 82 on the side of the shorter member of the lever 72, which extends rearwardly beyond the center of motion. This pin is not in contact with the shoulder when the stud 80 is in the recess.

The bar 78 is provided with an inclined edge running from the stud-holding recess forward and upward to the end of the bar, and that bar, as well as the trigger 77, is held with pressure up to the pin 82 and the roller-stud 80, respectively, by coiled springs 83 84. These parts are so adjusted that they remain in the positions indicated in Fig. 7 until a pin 16 strikes the toe 73 of a lever 72. This cannot occur until the oscillating carrier begins its movement to actuate the printing-segment and the adding-wheels. As soon as such movement begins the bar 42 will move out of contact with the levers 72, owing to the eccentric curvature of the latter relative to the axis of the carrier. There will therefore be a small space between the bar 42 and the curved inner edges of the levers. When a pin 16 on the movement of an adding-wheel strikes the toe 73 of a lever 72, the latter will be rocked on the shaft $e$, throwing the toe end downwardly and the opposite end upwardly. This movement will bring the pin 82 down onto the shoulder 81, which will stop the movement. At the same time the roller-stud 80 will be lifted out of the recess in the pivoted bar 78, and the latter will under the influence of the spring 84 move inwardly to a sufficient extent to bring the lower transverse edge of its inclined portion into contact with the roller-stud 80. The same limited downward movement of the toe end of the lever 72 will also move the dog 74 sufficiently to bring the working face of its hook into engagement with the radial face of a tooth. The parts will then be held in these positions by the engagement of the pin 82 with the shoulder 81. The continued movement of the oscillating carrier will cause the bar 42 to strike the upper end of the trigger 77, and thereby disengage the shoulder 81 from the pin 82, and so leave the lever 72 free to rock on the shaft $e$. As soon as the pin 82 and shoulder 81 are disengaged the spring 84 will move the pivoted bar 78 inwardly and the roller-stud 80 will travel up its inclined edge portion, and so rock the lever 72 and cause the dog 74 to turn the adding-wheel to the extent of one tooth. The inward movement of the outer end of the lever 72 will be limited by the bar 89, which is mounted in the oscillating carrier and which when the carrier has moved to its extreme limit downwardly will be in position to be struck by the levers 72. In the return or upward movement of the oscillating carrier the rod 42 will engage the levers 72 and return them to the position indicated in Fig. 7. The function of the pins, therefore, is to elevate the forward end of the lever 72 sufficiently to raise the roller-stud partly out of the recess on the spring-impelled bar 78, so that it will ride on the incline as soon as the trigger releases the pin 82 on the shorter member of the lever, for until that part clears the pin the forward end of the lever cannot rise and the spring-impelled or actuated bar 78 cannot do its work, which is to press upward that end of the lever and draw back the dog 74.

A spring-held pawl 86, mounted on the common axis $e$ between the levers 72, prevents retrograde movement of the adding-wheel, and a curved guide-rail 87, fixed in stationary position between the heads of the oscillating carrier, limits the throw of the carrier and brings it to rest at the same point, both at the end of its forward and in its backward movement. This rail is curved concentric with the center of rotation of the carrier and is upwardly curved at the front and rear. At the latter end it extends upward in a rigid arm 88, by which it is supported from the shaft $x$. The same spring 83 which controls the trigger 77 also controls the pawl 86.

From the foregoing explanation it will be seen that first through the operation of the numeral-keys and afterward by the movement of the selector as effected by the oscillating carrier the printing-segments are set to bring in a horizontal line a row of figures composing the line to be printed and added, and the same movements also bring into action the setting mechanism of the adding-wheels, by which they are set forward to add to the previously-set row of figures; but that operation of carrying the increase from one adding-wheel to the next higher wheel in progression is performed by the spring-impelled bars 78 during the time or interval when the adding-wheels are not being acted on by the setting or the printing mechanism. During that carrying operation also the adding-wheels cannot move except as they are rotated one tooth or step by the levers and dogs previously set into action by the pins 16 on the adding-wheels.

In connection with the printing wheels or segments is provided a device to insure proper alinement of the figures across the entire set, the construction of which is shown in Figs. 1, 3, and 7.

A small rolling shaft 89, semicircular in cross-section between its bearings and carried in bearings in the heads 20 21 of the oscillating carrier, extends through the head 21 at the left side of the machine and on the projecting end is provided with a short arm 90, which in the forward or downward movement of the oscillating carrier is brought in contact with a stationary post 92$^a$ on the side plate $k$ of the main frame projecting in the path of the arm 90 and by contact with that part being turned with a short angular movement. The post 92$^a$ is fixed in such position that the arm 90 does not contact with it until the oscillating carrier has almost completed its forward movement, and until the arm 90 engages the post 92$^a$ the rolling shaft 89 will not turn in its bearings, but will present its flattened face to the adding-wheels and disks $w$ and not be in contact with them. The extent of that movement is sufficient to turn the rolling shaft 89 one-half a revolution, or thereabout, in its bearings or sufficient in extent to bring the angular edge of the rolling shaft down against the row of teeth or notches 14 on the front edges of the disks $w$, and thereby set the same all on the same horizontal line. This alinement is effected automatically, therefore, at the end of every forward movement of the oscillating carrier, by which the printing-segments are brought into position to print a row of figures. On the return movement of the oscillating carrier the arm 90 will move out of contact with post 92ª, and a spring 90ᵃ will act upon the arm 90 and turn the shaft back to its normal position, and the action of the spring is limited by a stop 90ᵇ, with which the arm contacts. (See Fig. 5.)

As in other machines of this class employing registering or adding wheels, it is necessary to reset the wheels to "zero" after printing the total under each set of columns printed and added, and in the present machine this operation is effected by a rock-shaft 91, carried in bearings in the sides of the oscillating carrier and having spaced cylindrical teeth or pins 92 projecting at right angles into the spaces between the adding-wheels. (See Figs. 1, 4, and 7.) Secured on the outer end of that shaft and lying against the outer face of the side plate 20 of the oscillating carrier is a lever-arm 93, with a curved outer end 94 setting in line with a short curved arm 95, fast on the inner end of a short shaft 96, that extends through the side plate i of the main frame and is provided on the outer end with a small lever or finger 97 for turning it. (See Figs. 1, 3, and 4.) A spring 98, acting against the principal lever-arm 93, holds that part up against the curved arm of the operating-shaft above and also holds the rock-shaft normally in such position that the squared ends of the teeth 92 stand clear of the pins 16 on the sides of the adding-wheels. When the lever 97 is depressed, however, the teeth of the rock-shaft 91 are turned to present their ends in the path of the pins 16, and in that position, being retained while the oscillating carrier makes its forward movement, the teeth meet those pins of the wheels that may stand behind it in line with their squared ends and carry such wheels forward with them, thereby leaving the same at the end of such forward movement on the same horizontal line across the entire series.

Across the printing-faces of the printing-segments and the adding-wheels at the rear of the machine are arranged paper-feeding mechanism, a vibrating platen carrying the paper in contact with the type-faces, and inking devices, all of which are actuated by motive force taken from the principal hand-lever and applied through the following mechanism, the construction of which will be understood from Figs. 2, 4, 5, and 6. The paper is drawn from a roll 100 by a roller 101, mounted for rotation on a fixed shaft 102, having bearings in the sides i k of the main frame. Intermittent rotation in the intervals between the impressions made by contact of the paper with the type-faces is given to the roller 101 from the movements of the rocking frame carrying the impression-pad or platen g. That frame composed of the side bars 104 and top bar 105 rocks on the shaft 102 in a vertical arc the extent of which is sufficient to bring the face of the pad g in contact with the printing-type on the wheels in front and the movement of which is effected in the forward throw of the hand-lever by a swinging lever 106, pivotally attached to a rock-shaft 107, supported in the side plates i and k of the main frame, said lever having its lower end standing in the path of a pin 108 on the segmental disk 48. A slotted bar 109, attached to the lever 106 at a point 110 above the free end, connects that part with the rocking frame 104 through the medium of a stud 112 on the side bar of the rocking frame working in the slot of the bar 109. A spring 113, interposed between the stud and the back end of the slot, holds the stud forward in the slot, so as to carry the rocking frame forward as the lever 106 is moved by the disk 48 and bring the pad g against the type; but at the same time the stud by giving a yielding instead of a rigid connection with the slotted bar compensates for the difference existing in the space between the impression-pad and the face of the printing-segments that print the figures in rows and the face of the adding-wheels, which is of smaller radius than the first-mentioned printing-segments. The position of the stud 112 is controlled in the slot of the connecting-bar by coiled springs 113 115 acting on opposite sides, the former allowing the bar to slide back and let the pin 108 pass by the lower end of the lever 106 in the return movement and afterward returning the lever forward to position, while the latter spring gives proper resistance to the stud 112 to cause the slotted bar to draw the pad-carrying frame forward for the impression. In this operation the lever 106 has the same length of throw whether the pad makes contact with the printing-segments a or with the adding-wheels b to print the total; but in the former case the length of the arc in which the pad is moved being shorter the slotted bar compensates for the difference in the length by allowing the slotted bar to slide on the stud 112 without straining the parts. The parts of the printing mechanism are arranged and operate to effect the printing while the oscillating carrier is moving laterally from left to right.

Step-by-step movements of the paper-feeding roller 101 in the intervals between the impressions are produced by a ratchet-wheel 116 on the journal of the roller and a spring-held pawl 117 on the pad-carrying frame 104. In every return of the frame after bringing the pad against the type the pawl engages and turns the ratchet-wheel one tooth, thereby moving the paper the required distance to space the lines of printing. The paper is held against the periphery of the roller by endless bands 118, passing around two rollers 119 120, the shafts of which are provided with bearings in the sides of the main frame. After each impression the platen g is returned to position clear of the printing-wheels by a coiled spring 121, attached to the side bar 104 of the platen-carrying frame, as seen in Fig. 5. This spring is put in tension when the rocking lever 106 is engaged and moved by the stud 108 on the segmental disk 48, and as soon as the stud passes the lower end of that lever the spring acts to draw the platen away from the wheels.

The inking-roller $h$, Fig. 12, is suspended from the rock-shaft 107 by slotted arms 122 between the platen and the printing-faces of the wheels, and it is adjusted to make contact with the faces of both wheels and afterward to stand out of the path of the platen before that part brings the paper forward to receive the impression by means of the mechanism controlled from the platen, the operation of which will be understood from Figs. 4, 5, and 6. The arms 122 are rigidly connected to the rock-shaft 107, and in the slots of these arms the journals 123 of the roller are moved upward to clear the platen and are moved downward to make contact with the type by switching-grooves 124 of triangular form in the side plates 125, in which the journals of the inking-roller are arranged to travel in the movements of the rocking frame. The grooved plates 125 are practically forward extensions of the side bars 104 of the rocking frame, and the switch-grooves are so arranged that in every forward throw of the platen-carrying frame the inking-roller is caused first to move down the slotted arms, and on reaching the bottom of the slots the roller is carried against the type-faces of the wheels, and afterward in the continued movement of the carrying-frame the upward and rearward switch-groove carries the roller backward and above the path of the platen, which then passes under the roller and makes contact with the wheels. In the return or backward throw of the platen-carrying frame the journals of the inking-roller travel in the concentric upper portion of the switch-groove and return to the starting-point at the junction of the last-mentioned concentric portion and the downwardly-inclined portion of the groove, at which point it stands at rest until the next forward throw of the platen. A pivoted switch-piece 128, forming the lower side of the upper concentric groove and the upper guiding edge of the inclined portion below, is held in position with the tail of the switch-piece against a stop 126 by a spring 127. It will be obvious, however, that the inking-roller requires a greater extent of movement toward the wheels for inking the faces of the total printing-wheels than is required to ink the printing-segments of the disks $w$. Provision must be made for the additional throw of the inking-roller as often as the total is to be printed. For that purpose a hand-controlled lever 130 is fixed at its lower end on the shaft 107, and its upper end is provided with a finger-piece 129, extending from the outside through a curved slot 132 in the side plate $k$ of the frame, and a coiled spring 131, attached to the upper end of the lever, holds the same normally in the upright position, (seen in Fig. 5,) with the finger-piece 129 at one end of the slot. This spring also holds the slotted arms in their normal position, which is to ink the printing-segments.

By pushing the finger-piece 129 toward the rear of the machine with one hand while the hand-lever is operated by the other the lower ends of the slotted arms will be set in toward the faces of the total printing-wheels $b$, so that in the following forward throw of the platen as the journals of the roller travel down the switch-grooves in the extensions the inking-surface of the roller will be brought against the printing-faces of the wheels $b$ just in advance of the forward movement of the platen. On release of the lever 128 by the operator the spring resets the parts in position to ink the printing-segments, and after each operation of setting the selecting device from the numeral-keys to print a row of figures the hand-lever is thrown forward and back with a definite length of throw, actuating the oscillating carrier and also the disk 48 and connected parts from which the carrying mechanism and the paper-feeding and inking devices are operated.

Having thus fully described my invention, what I claim as new therein, and desire to secure by Letters Patent, is—

1. In an adding and recording machine, a series of adding-wheels and a recording device to each adding-wheel, a selecting device, a series of numeral-keys, means controlled by the keys for operatively connecting the selecting device with the recording devices and their corresponding adding-wheels in required number and numerical order, and means for moving the selecting device into engagement with the recording devices to set the recording devices and adding-wheels to position.

2. In an adding and recording machine, a series of adding-wheels and a recording device to each adding-wheel, means to detachably connect the recording devices with their respective adding-wheels, a selecting device, a series of numeral-keys, means controlled by the keys for operatively connecting the selecting device with the recording devices and their corresponding adding-wheels in required number and numerical order, and means for moving the selecting device into engagement with the recording devices to set the recording devices and adding-wheels to position.

3. In an adding-machine, a series of adding-wheels, a separate recording device to each adding-wheel, a series of numeral-keys, a selecting device movable in a circular path around the adding-wheels and recording devices and also transversely with reference thereto, means controlled by the keys for operatively connecting the selecting device with the adding-wheels and recording devices in number and numerical order according to the keys selected and operated, and means for moving the selecting device in a circular path to effect the connection between said key-controlled means and the adding-wheels and recording devices.

4. The combination of a series of adding-wheels, one to each numerical order, having type-face numerals, recording devices corresponding in number with the adding-wheels and bearing type-face numerals, said wheels and devices being mounted for rotation on a common axis, a selecting device rotatable on the same axis and also movable transversely with reference to the numeral-bearing faces of the adding-wheel and recording devices, a series of numeral-keys, and means actuated therefrom whereby the selecting device is set for selecting and engaging with the adding-wheels and their corresponding recording devices in number and numerical order according to the particular keys being operated, means for rotating said selecting device to connect the same with the adding-wheels and recording devices and to set them to position, and means for disconnecting the selecting device and returning it to position for repeating the operation.

5. In an adding and recording machine, a series of adding-wheels, a recording device to each wheel, means for detachably connecting the recording devices to their respective adding-wheels, a selecting device having movable pins, keys for adjusting the pins, and means for moving the selecting device to bring the adjusted pins into engagement with recording devices to move the latter, substantially as set forth.

6. The combination of a series of adding-wheels, one to each numerical order, and having numerals with printing-faces on their peripheries and spaced ratchet-teeth concentric with the axis of the wheels, a recording device to each adding-wheel comprising a disk mounted for rotation on the axis of the adding-wheel, a flanged segment on the periphery of the disk overlying the type-face of the wheel and bearing numerals with printing-faces in a row coincident with the plane of rotation and a dog on said disk adapted to engage the ratchet-teeth of the adding-wheel and lock the wheel and the disk in one direction of its rotation, a keyboard having a series of keys, a selecting device movable transversely into and out of position with reference to the keys and the recording device and having oscillating movement in a path concentric with the recording device, means operated from the keys for connecting the selecting device with the disks of the recording devices in predetermined order according to the numerical values of the keys brought into action, and means for oscillating the selecting device to set the adding-wheels and recording devices.

7. The combination of rotative adding-wheels, a rotative recording device for each wheel, each recording device having a projecting contact, means for detachably locking the recording devices to their respective adding-wheels, a selecting device carrying movable pins, keys for adjusting said pins, and means for moving said selecting device about the axis of the recording devices to bring the adjusted keys into engagement with the projecting contacts of the recording devices lying in the path of such pins, substantially as set forth.

8. The combination of rotative adding-wheels, a rotative recording device for each wheel, each recording device having a projecting contact, means for detachably locking the recording devices to their respective adding-wheels, a selecting device carrying movable pins, keys for adjusting said pins, means for moving said selecting device step by step transversely of the recording devices, and means for moving the selecting device about the axis of the recording devices to bring the adjusted keys into engagement with the projecting contacts of the recording devices lying in the path of such pins, substantially as set forth.

9. The combination of adding-wheels, a recording device to each adding-wheel, adapted to print the numbers registered on and added by the adding-wheels, independently of said wheels, a selecting device adapted to operate both the recording devices and their corresponding adding-wheels, keys controlling the adjustment of the selecting device with reference to its action on the recording devices, means for connecting the recording devices with their respective adding-wheels, an oscillating carrier adapted to actuate the selecting device, means for impelling the said carrier in one direction to set the connected recording devices and adding-wheels, means for moving the selecting device laterally to disconnect it from the adding-wheels, and means for returning the selecting device to its primary position and simultaneously returning the recording devices to their normal positions, substantially as set forth.

10. The combination with adding-wheels, recording devices corresponding in number with the adding-wheels, a series of operating-keys, a selecting device, means controlled by the keys for operatively connecting the selecting device with the recording devices in number and in numerical order according to the number and the numerical value of the keys operated, a carrier having a definite extent of movement operating the selecting device, and locking means controlling and controlled by the keys and the selecting-device carrier and operating to lock the keys when the carrier is moving and to lock the carrier when a key is being operated.

11. The combination of a series of adding-wheels having type-faced numerals adapted to record the added numbers, a series of recording devices having type-faced numerals arranged to print a row of numbers as the same are registered on the adding-wheels, a selecting device movable transversely of the recording devices step by step, a series of keys controlling the same, means controlled by the same keys for operatively connecting the selecting device with the recording device in number and numerical order corresponding to the number and sequence of the operated keys, a carrier operating the selecting device to rotate the connected recording devices, and means operatively connecting the recording devices with the adding-wheels in one direction of the movement and disconnecting the same in the contrary movement of the carrier.

12. The combination of a series of adding-wheels having type-face numerals adapted to record the total numbers added, a series of recording devices having type-faced numerals arranged to print the numbers as registered on the adding-wheels an oscillating carrier, a series of keys, means controlled by the keys for operatively connecting the carrier with the recording-wheels and the adding-wheels to set the same in number and numerical order corresponding to the number and sequence of the keys operated, an impression device, an inking means, and means operating to bring the impression device and inking means in contact first with the printing-face of the recording devices and afterward with the printing-faces of the adding-wheels.

13. The combination with a series of adding-wheels, and a series of recording devices rotatably mounted on a common axis, of a selecting device, an oscillating carrier in which said selecting device is mounted for transverse movement across the recording devices and adding-wheels, a series of keys, means controlled by the same and moving the selecting device step by step into operative relation to the wheels, means also controlled by the same keys for connecting the selecting device with the recording devices and adding-wheels, an operating-handle, and means operated thereby to first move the carrier about the axis of the recording devices to set the latter and the adding-wheels, then to move it transversely in a direction opposite to that of the step-by-step movement, and then about the axis of the recording devices in a direction opposite the first movement, substantially as set forth.

14. The combination with an oscillating carrier, of a rock-shaft, a crank-arm fast thereon, a slotted connecting-rod pivotally attached to the crank-arm and to the carrier by a stud working in the slot in the rod, a swinging arm attached at one end to the stud and having its free end loosely resting on the end of the crank-arm, and a stop adapted to connect the said arm and the connecting-rod together while the crank is traveling on one side of the center, and to disconnect the said arm while moving on the opposite side.

15. The combination of a series of adding-wheels, a series of numeral-keys, a selecting device movable transversely across the said wheels, means actuated by said keys for moving the selecting device across said adding-wheels, consisting of a slide-plate having an inclined slot for each key, a rocker-arm operated by the key and engaging said slot, a rack on the selecting device, a pawl carried by the slide-plate and adapted to be thrown into engagement with the teeth of the rack in every longitudinal movement of the slide-plate toward the selecting device.

16. The combination of adding-wheels, a selecting device, means operatively connecting the selecting device with the adding-wheels to rotate the same and determining which of the adding-wheels may be rotated in each selecting and actuating movement of the selecting device, an oscillating lever, means connecting the lever with the selecting device to actuate the latter and a lever-controlling device operating to prevent reverse movement of the lever at any point in its oscillating movement when traveling in either direction until the full length of throw has been given.

17. The combination with a series of adding-wheels and a series of recording devices, one of each for each order of numbers, and all having a common axis of rotation, and means for detachably connecting the recording devices with their respective adding-wheels, of a series of numeral-keys, a selecting device, movable transversely over the series of recording devices and also having an oscillating movement in an arc coincident with the axis of the recording devices, means operated by the numeral-keys for setting the selecting device by a series of step-by-step movements into operative relation to engage and actuate one or more of the recording devices at will the number of such steps determining the number and the numerical order of the recording devices, and their adding-wheels selected and actuated by the oscillating movement of the selecting device.

18. The combination with a series of depressible keys, of a longitudinally-movable plate having inclined slots, an arm engaging each slot pivotally attached to a point beyond the plane of movement of the slide-plate to move in a vertical plane coincident with the movement of the key and having the key attached thereto, a spring adapted to return the arm to the top of the slot on the release of the key, and means controlling the movement of the slide-plate consisting of the toothed block on the slide-plate, and the spring-controlled arm engaging the toothed block.

19. The combination with a series of adding-wheels one for each numerical order, of a spring-actuated carrying device to each adding-wheel adapted to rotate the wheel the distance of one number when brought into action but held out of action when the wheels are being rotated to add, means controlled by the adding-wheel for setting the carrying device of each wheel for action in every movement of the wheel of next lower denomination ten numbers, throw-off devices to simultaneously release the previously-set carrying devices, and bring the same into action, and a device movable in one direction to operate the adding-wheels to add a number and also to operate the throw-off devices, and movable in the reverse direction to reset the carrying devices, substantially as set forth.

20. The combination with adding-wheels, one for each numerical order, a selecting device, numeral-keys operatively connecting the selecting device with and determining the number and order of the wheels to be actuated and an oscillating carrier actuating the selecting device, of a spring-actuated carrying device to each adding-wheel adapted to rotate the wheel the distance of one number when brought into action but held out of action when the wheels are being rotated to add, setting mechanism controlled by the adding-wheels for setting the carrying device of each wheel into position for action in every movement of the wheel of the next lower denomination ten numbers, means operated by movement of the oscillating carrier in one direction for simultaneously releasing and bringing into action the previously-set carrying devices, and means operative by the return movement of the oscillating carrier for returning the carrying devices to position for the next carrying operation.

In testimony whereof I have hereunto subscribed my name in the presence of two witnesses.

ADAM HOCH.

Witnesses:
  EDWARD E. OSBORN,
  M. REGNER.